United States Patent
Tsunoya et al.

(10) Patent No.: US 11,826,826 B2
(45) Date of Patent: Nov. 28, 2023

(54) THREE-DIMENSIONAL SHAPING APPARATUS

(71) Applicant: Seiko Epson Corporation, Tokyo (JP)

(72) Inventors: Akihiko Tsunoya, Okaya (JP); Toshimitsu Hirai, Hokuto (JP); Kaoru Momose, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/387,712

(22) Filed: Jul. 28, 2021

(65) Prior Publication Data

US 2022/0032378 A1 Feb. 3, 2022

(30) Foreign Application Priority Data

Jul. 31, 2020 (JP) .................. 2020-130105

(51) Int. Cl.
| | |
|---|---|
| *B33Y 30/00* | (2015.01) |
| *B22F 10/85* | (2021.01) |
| *B33Y 40/00* | (2020.01) |
| *B22F 12/00* | (2021.01) |
| *B28B 1/00* | (2006.01) |
| *B28B 17/00* | (2006.01) |
| *B33Y 50/02* | (2015.01) |

(52) U.S. Cl.
CPC ............ *B22F 10/85* (2021.01); *B22F 12/00* (2021.01); *B28B 1/001* (2013.01); *B28B 17/0081* (2013.01); *B33Y 30/00* (2014.12); *B33Y 40/00* (2014.12); *B33Y 50/02* (2014.12)

(58) Field of Classification Search
CPC .......... B22F 10/85; B22F 12/00; B33Y 30/00; B33Y 40/00; B33Y 50/02; B28B 1/001; B28B 17/0081
See application file for complete search history.

(56) References Cited

U.S. PATENT DOCUMENTS

| | | | |
|---|---|---|---|
| 6,596,224 B1 * | 7/2003 | Sachs ............. | B33Y 10/00 |
| | | | 425/84 |
| 2016/0257071 A1 * | 9/2016 | Okamoto ........... | B29C 64/165 |
| 2016/0297097 A1 * | 10/2016 | Riman ............... | C04B 35/46 |
| 2017/0348914 A1 * | 12/2017 | Teken ............... | B29C 64/209 |
| 2018/0354192 A1 | 12/2018 | Iwase et al. | |
| 2020/0331208 A1 * | 10/2020 | Korol ............... | B29C 64/393 |
| 2021/0206055 A1 * | 7/2021 | Ederer .............. | B29C 64/165 |

FOREIGN PATENT DOCUMENTS

| | | | |
|---|---|---|---|
| JP | 2019-001010 | 1/2019 | |
| WO | WO-2006100964 A1 * | 9/2006 | ............ B28B 1/00 |

* cited by examiner

*Primary Examiner* — Yung-Sheng M Tsui (74) *Attorney, Agent, or Firm* — WORKMAN NYDEGGER (57) ABSTRACT

A three-dimensional shaping apparatus includes a shaping table, a layer forming section that forms a powder layer at the shaping table, a first head that ejects a liquid containing a binder to a shaping region from a first nozzle, a second head that ejects a liquid containing ceramic particles to a boundary region with respect to the shaping region from a second nozzle, and a control unit that controls movement of the first head and the second head with respect to the shaping table and driving of the first head and the second head by applying a voltage, wherein the control unit performs control so as to cause the first head to execute a first flushing operation and to cause the second head to execute a second flushing operation under a flushing condition different from that for the first flushing operation.

13 Claims, 8 Drawing Sheets

THREE-DIMENSIONAL SHAPING APPARATUS

BACKGROUND

The present application is based on, and claims priority from JP Application Serial Number 2020-130105, filed on Jul. 31, 2020, the disclosure of which is hereby incorporated by reference herein in its entirety.

1. Technical Field

The present disclosure relates to a three-dimensional shaping apparatus.

2. Related Art

Heretofore, various types of three-dimensional shaping apparatuses have been used. Among these, there is a three-dimensional shaping apparatus for producing a three-dimensional shaped article by forming a powder layer and ejecting a liquid containing a binder from a nozzle to a shaping region of the three-dimensional shaped article in the powder layer. For example, JP-A-2019-1010 (Patent Document 1) discloses a three-dimensional shaping apparatus for producing a three-dimensional shaped article by forming a layer with a powder material and ejecting a curing liquid to the layer from a nozzle of a line head.

In the three-dimensional shaping apparatus described in the Patent Document 1, a flushing stage for executing a flushing operation of ejecting the curing liquid in the nozzle is formed. By the flushing operation, a foreign substance in the nozzle is removed. The flushing operation is generally performed under the same ejection condition as when the three-dimensional shaped article is produced, that is, when the liquid is ejected to the shaping region of the three-dimensional shaped article in order to simplify the control during the flushing operation. However, recently, the three-dimensional shaped article has come to be produced using various materials or various methods, and various powders or various liquids have come to be used. Therefore, depending on the powder to be used, much powder is sometimes thrown up and mixed in the nozzle, and also depending on the liquid to be used, even when the flushing operation is performed, the powder mixed in the nozzle sometimes cannot be effectively removed. If the powder mixed in the nozzle cannot be removed, liquid ejection failure or the like may occur.

SUMMARY

A three-dimensional shaping apparatus according to the present disclosure for solving the above problem includes a shaping table, a layer forming section that forms a powder layer at the shaping table, a first head that ejects a liquid containing a binder to a shaping region of a three-dimensional shaped article in the powder layer from a first nozzle, a second head that ejects a liquid containing ceramic particles to a boundary region with respect to the shaping region in the powder layer from a second nozzle, and a control unit that controls movement of the first head and the second head with respect to the shaping table and driving of the first head and the second head by applying a voltage, wherein the control unit performs control so as to cause the first head to execute a first flushing operation and to cause the second head to execute a second flushing operation under a flushing condition different from that for the first flushing operation.

Further, a three-dimensional shaping apparatus according to the present disclosure for solving the above problem includes a shaping table, a layer forming section that forms a powder layer at the shaping table, a first head that ejects a liquid containing light absorbing particles to a shaping region of a three-dimensional shaped article in the powder layer from a first nozzle, a second head that ejects a liquid containing a colloidal ink or a polymeric ink to a boundary region with respect to the shaping region in the powder layer from a second nozzle, and a control unit that controls movement of the first head and the second head with respect to the shaping table and driving of the first head and the second head by applying a voltage, wherein the control unit performs control so as to cause the first head to execute a first flushing operation and to cause the second head to execute a second flushing operation under a flushing condition different from that for the first flushing operation.

DESCRIPTION OF EXEMPLARY EMBODIMENTS

First, the present disclosure will be schematically described.

A three-dimensional shaping apparatus according to a first aspect of the present disclosure for solving the above problem includes a shaping table, a layer forming section that forms a powder layer at the shaping table, a first head that ejects a liquid containing a binder to a shaping region of a three-dimensional shaped article in the powder layer from a first nozzle, a second head that ejects a liquid containing ceramic particles to a boundary region with respect to the shaping region in the powder layer from a second nozzle, and a control unit that controls movement of the first head and the second head with respect to the shaping table and driving of the first head and the second head by applying a voltage, wherein the control unit performs control so as to cause the first head to execute a first flushing operation and to cause the second head to execute a second flushing operation under a flushing condition different from that for the first flushing operation.

According to this aspect, by ejecting the liquid containing the ceramic particles to the boundary region in the powder layer, the liquid containing the binder ejected to the shaping region can be prevented from flowing beyond the boundary region. Further, even if the liquid containing the binder flows beyond the boundary region, by disposing ceramic particles at the boundary region, the ceramic particles can be easily and completely removed during sintering or the like, and a three-dimensional shaped article with high precision can be formed. Further, a preferred flushing condition is different between the first head that ejects the liquid containing the binder and the second head that ejects the liquid containing the ceramic particles, however, by executing the second flushing operation for the second head under a flushing condition different from that for the first flushing operation executed for the first head, flushing can be carried out under a preferred flushing condition for each of the first head and the second head. Therefore, it is possible to suppress that the powder mixed in the nozzle cannot be removed even if the flushing operation is performed.

In a three-dimensional shaping apparatus according to a second aspect of the present disclosure, in the first aspect, a frequency of a waveform input to the second head in the second flushing operation is higher than a frequency of a waveform input to the first head in the first flushing operation.

In general, it is often more difficult to discharge a powder mixed in a nozzle when there is a liquid containing ceramic particles in the nozzle than when there is a liquid containing a binder in the nozzle. However, according to this aspect, the frequency of the waveform input to the second head in the second flushing operation is higher than the frequency of the waveform input to the first head in the first flushing operation. When the frequency of the waveform input to the head is set high, it becomes possible to effectively discharge a powder mixed in the nozzle, and therefore, according to this aspect, not only when a powder is mixed in the first head, but also when a powder is mixed in the second head, the powder mixed in the nozzle can be effectively discharged.

In a three-dimensional shaping apparatus according to a third aspect of the present disclosure, in the first or second aspect, the voltage applied to the second head in the second flushing operation is higher than the voltage applied to the first head in the first flushing operation.

According to this aspect, the voltage applied to the second head in the second flushing operation is higher than the voltage applied to the first head in the first flushing operation. When the voltage applied to the head is set high, it becomes possible to effectively discharge a powder mixed in the nozzle, and therefore, according to this aspect, not only when a powder is mixed in the first head, but also when a powder is mixed in the second head, the powder mixed in the nozzle can be effectively discharged.

In a three-dimensional shaping apparatus according to a fourth aspect of the present disclosure, in any one of the first to third aspects, an ejection rate of the liquid containing the ceramic particles from the second head in the second flushing operation is higher than an ejection rate of the liquid containing the binder from the first head in the first flushing operation.

According to this aspect, the ejection rate of the liquid containing the ceramic particles from the second head in the second flushing operation is higher than the ejection rate of the liquid containing the binder from the first head in the first flushing operation. When the ejection rate of the liquid from the head is set high, it becomes possible to effectively discharge a powder mixed in the nozzle, and therefore, according to this aspect, not only when a powder is mixed in the first head, but also when a powder is mixed in the second head, the powder mixed in the nozzle can be effectively discharged.

In a three-dimensional shaping apparatus according to a fifth aspect of the present disclosure, in any one of the first to fourth aspects, a droplet size of the liquid containing the ceramic particles ejected from the second head in the second flushing operation is larger than a droplet size of the liquid containing the binder ejected from the first head in the first flushing operation.

According to this aspect, the droplet size of the liquid containing the ceramic particles ejected from the second head in the second flushing operation is larger than the droplet size of the liquid containing the binder ejected from the first head in the first flushing operation. When the ejection amount of the liquid from the head is set large, it becomes possible to effectively discharge a powder mixed in the nozzle, and therefore, according to this aspect, not only when a powder is mixed in the first head, but also when a powder is mixed in the second head, the powder mixed in the nozzle can be effectively discharged.

In a three-dimensional shaping apparatus according to a sixth aspect of the present disclosure, in any one of the first to fifth aspects, the second head includes a pressure chamber that communicates with the second nozzle, a supply channel for supplying the liquid containing the ceramic particles to the pressure chamber, and a circulation channel in which the liquid containing the ceramic particles flows from the pressure chamber for circulation.

The ceramic particles are heavy and are likely to precipitate, however, according to this aspect, the second head includes a circulation channel for circulating the liquid containing the ceramic particles. Therefore, precipitation of the ceramic particles can be suppressed by circulating the liquid containing the ceramic particles, and a trouble caused by precipitation of the ceramic particles in the liquid containing the ceramic particles can be suppressed.

In a three-dimensional shaping apparatus according to a seventh aspect of the present disclosure, in the sixth aspect, the control unit performs control so that when a flow rate of the liquid containing the ceramic particles that flows in the circulation channel per unit time is represented by q1 and a maximum flow rate of the liquid containing the ceramic particles ejected from the second nozzle per unit time is represented by q2, q2/q1 becomes 0.05 or more and 20 or less.

According to this aspect, the flow rate of the liquid containing the ceramic particles flowing in the circulation channel is controlled to be within an appropriate range. According to this, an increase in a pressure difference between the pressure applied to the liquid in the second nozzle and the outside air pressure can be suppressed. By suppressing the increase in the pressure difference, mixing of the powder in the second nozzle can be suppressed.

In a three-dimensional shaping apparatus according to an eighth aspect of the present disclosure, in the seventh aspect, the q2/q1 is 0.05.

According to this aspect, the flow rate of the liquid containing the ceramic particles flowing in the circulation channel can be controlled to be within a particularly preferred range. According to this, the increase in the pressure difference between the pressure applied to the liquid in the second nozzle and the outside air pressure can be particularly effectively suppressed, and mixing of the powder in the second nozzle can be particularly effectively suppressed.

In a three-dimensional shaping apparatus according to a ninth aspect of the present disclosure, in any one of the first to eighth aspects, the ceramic particles contain anatase-type $TiO_2$.

According to this aspect, the liquid containing the ceramic particles containing anatase-type $TiO_2$ is used. The particle diameter of an anatase-type $TiO_2$ particle is smaller than that of other general ceramic particles, and therefore, the surface activity of the ceramic particles becomes high, so that the ceramic particles are easily dispersed in the liquid stored in the second head. Further, the anatase-type $TiO_2$ particle is more easily decomposed than a rutile-type $TiO_2$ particle, and therefore, the boundary region can be easily removed from the shaped three-dimensional shaped article.

A three-dimensional shaping apparatus according to a tenth aspect of the present disclosure includes a shaping table, a layer forming section that forms a powder layer at the shaping table, a first head that ejects a liquid containing light absorbing particles to a shaping region of a three-dimensional shaped article in the powder layer from a first nozzle, a second head that ejects a liquid containing a colloidal ink or a polymeric ink to a boundary region with respect to the shaping region in the powder layer from a second nozzle, and a control unit that controls movement of the first head and the second head with respect to the shaping table and driving of the first head and the second head by applying a voltage, wherein the control unit performs control so as to cause the first head to execute a first flushing operation and to cause the second head to execute a second flushing operation under a flushing condition different from that for the first flushing operation.

A preferred flushing condition is different between the first head that ejects the liquid containing the light absorbing particles and the second head that ejects the liquid containing the colloidal ink or the polymeric ink, however, by executing the second flushing operation for the second head under a flushing condition different from that for the first flushing operation executed for the first head, flushing can be carried out under a preferred flushing condition for each of the first head and the second head. Therefore, it is possible to suppress that the powder mixed in the nozzle cannot be removed even if the flushing operation is performed.

Hereinafter, embodiments according to the present disclosure will be described with reference to the accompanying drawings.

First, one embodiment of a three-dimensional shaping apparatus 1 of the present disclosure will be described with reference to FIG. 1. Here, in FIG. 1 and the respective drawings described later, an X direction in the drawings is a horizontal direction and corresponds to a reciprocating movement direction of a supply unit 8, and in the X direction, an X1 direction is a forward direction and an X2 direction is a backward direction. Further, a Y direction is a horizontal direction and is also a direction orthogonal to the X direction and corresponds to a direction in which the rotational axis of a roller 6 extends. Further, a Z direction is a vertical direction and corresponds to a stacking direction of a layer 500.

Note that the "three-dimensional shaping" as used herein refers to formation of a so-called stereoscopically shaped article, and also includes, for example, formation of a shape having a thickness even if it is in a flat plate shape or a so-called two-dimensional shape.

The three-dimensional shaping apparatus 1 of this embodiment is a three-dimensional shaping apparatus for producing a three-dimensional shaped article by stacking the layer 500 composed of a layer 501, a layer 502, a layer 503, . . . and a layer 50n. Then, as shown in FIG. 1, the three-dimensional shaping apparatus 1 of this embodiment includes a table unit 10 having a shaping table 9, a supply unit 8 that supplies a shaping material of the three-dimensional shaped article to the shaping table 9, and a control unit 12 that controls the operation of the table unit 10 and the supply unit 8. The three-dimensional shaping apparatus 1 is electrically coupled to an external device 20 such as a personal computer and is configured to be able to receive an instruction from a user through the external device 20.

The shaping table 9 is configured to be able to move in the Z direction under the control of the control unit 12. A shaping face 9a of the shaping table 9 is disposed at a position lower by a predetermined distance in the Z direction with respect to an upper face portion 10a of the table unit 10, and the layer 500 for one layer is formed by supplying the shaping material of the three-dimensional shaped article from the supply unit 8 to the shaping face 9a. Then, layers are stacked by repeating movement of the shaping table 9 downward by a predetermined distance and supply of the shaping material of the three-dimensional shaped article from the supply unit 8. FIG. 1 shows a manner in which a structure body S of the three-dimensional shaped article is formed on the shaping face 9a by repeating layer formation of four layers: a layer 501, a layer 502, a layer 503, and a layer 504.

The supply unit 8 is configured to be able to move in the X direction along a guide bar 11. Further, the supply unit 8 includes a shaping material supply section 2 that supplies the shaping material containing a powder of a metal or the like to the shaping table 9.

Further, the supply unit 8 includes a roller 6 capable of compressing and leveling the shaping material supplied to the shaping table 9. Here, the shaping material supply section 2 and the roller 6 constitute a layer forming section which forms the layer 500 that is a powder layer at the shaping table 9. The supply unit 8 may include a squeegee capable of leveling the shaping material supplied to the shaping table 9 in place of the roller 6.

Further, the supply unit 8 includes a first head 3 that ejects a liquid containing a binder which binds the powder contained in the shaping material supplied from the shaping material supply section 2 to a shaping region P of the three-dimensional shaped article from a first nozzle N1. Here, the liquid to be ejected from the first head 3 is a liquid containing a UV curable resin as the binder. However, it is not limited to such a liquid, and a liquid containing a thermosetting resin as the binder, a liquid in a state where a solid resin as the binder is dissolved in a volatile solvent, or the like may be used.

Further, the supply unit 8 includes a second head 13 that ejects a liquid containing ceramic particles to a boundary region B with respect to the shaping region P from a second nozzle N2. Here, the liquid to be ejected from the second head 13 is a liquid containing anatase-type $TiO_2$ as the ceramic particles. However, it is not limited to such a liquid, and a liquid containing ceramic particles other than anatase-type $TiO_2$ may be used as the ceramic particles. By ejecting the liquid containing the ceramic particles to the boundary region B, bleeding of the binder from the shaping region P to the outside is suppressed, and the contour of the structure body S of the three-dimensional shaped article can be neatly formed, and also the powder adhered to the structure body S of the three-dimensional shaped article can be completely detached when the structure body S of the three-dimensional shaped article is taken out.

Then, the supply unit 8 includes a UV irradiation section 4 that irradiates an ultraviolet ray capable of curing the UV curable resin. The supply unit 8 of this embodiment is configured to include the UV irradiation section 4, however, a configuration in which a heater for curing the thermosetting resin or for volatilizing the solvent is included in place of the UV irradiation section 4, or the like may be adopted.

Figure 1:
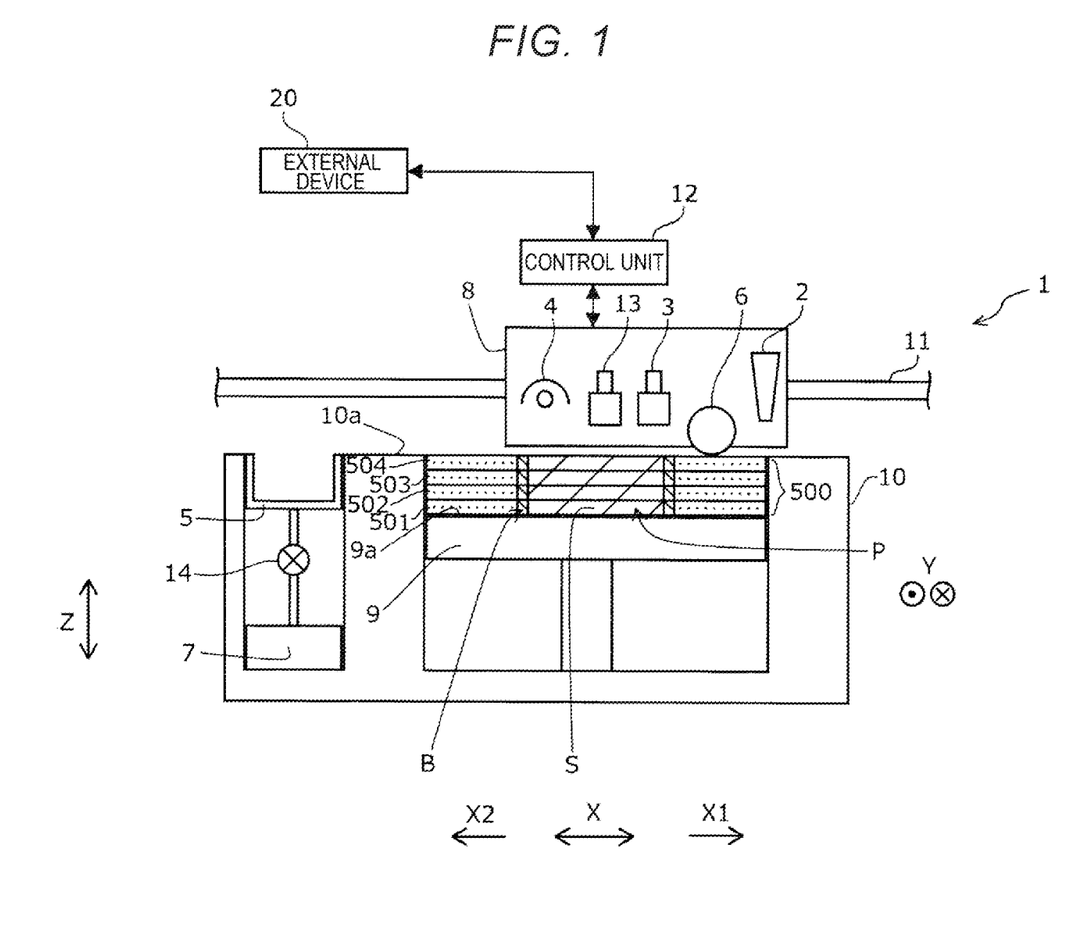
FIG. 1 is a schematic configuration view showing a three-dimensional shaping apparatus of the present disclosure according to an embodiment.

As shown in FIG. 1, in the supply unit 8 of this embodiment, the shapes of the constituent members are asymmetric in the X direction. However, the supply unit 8 may be configured such that the shapes of the constituent members are symmetric in the X direction. If the supply unit 8 has such a configuration that the shapes of the constituent members are symmetric in the X direction, the shaping operation of the three-dimensional shaped article can be executed while moving the supply unit 8 in the X1 direction, and also the shaping operation of the three-dimensional shaped article can be executed while moving the supply unit 8 in the X2 direction.

Further, as shown in FIG. 1, in the three-dimensional shaping apparatus 1 of this embodiment, a liquid receiving section 5 is provided in the table unit 10, and a flushing operation can be executed by ejecting a liquid from the first head 3 and the second head 13 at a position opposed to the liquid receiving section 5. That is, the position opposed to the liquid receiving section 5 is a flushing position, and therefore, naturally, the flushing position is a position different from the shaping region P of the three-dimensional shaped article. The liquid received by the liquid receiving section 5 can be allowed to flow to a waste liquid tank 7 by driving a pump 14.

Here, the control unit 12 applies a voltage to the first head 3 and the second head 13 at the position opposed to the liquid receiving section 5 that is the flushing position so as to execute the flushing operation of ejecting a liquid from the first nozzle N1 and the second nozzle N2. In the three-dimensional shaping apparatus 1 of this embodiment, the position opposed to the liquid receiving section 5 is set as the flushing position, but the apparatus is not limited to such a configuration, and for example, a region different from the shaping region P on the shaping face 9a may be set as the flushing position.

In this manner, the three-dimensional shaping apparatus 1 of this embodiment includes the shaping table 9, the shaping material supply section 2 and the roller 6 as the layer forming section which forms the layer 500 that is a powder layer at the shaping table 9, the first head 3 that ejects the liquid containing the binder to the shaping region P of a three-dimensional shaped article in the layer 500 from the first nozzle N1, the second head 13 that ejects the liquid containing the ceramic particles to the boundary region B with respect to the shaping region P in the layer 500 from the second nozzle N2, the supply unit 8 and the table unit 10 as the moving system that relatively moves the first head 3 and the second head 13 with respect to the shaping table 9, and the control unit 12 that controls the movement of the first head 3 and the second head 13 with respect to the shaping table 9 and the driving of the first head 3 and the second head 13 by applying a voltage. Further, the apparatus includes the liquid supply system 40 that supplies a liquid to the first head 3 and the second head 13.

In the three-dimensional shaping apparatus 1 of this embodiment, by ejecting the liquid containing the ceramic particles to the boundary region B in the layer 500, the liquid containing the binder ejected to the shaping region P can be prevented from flowing beyond the boundary region B. Further, even if the liquid containing the binder flows beyond the boundary region B, by disposing ceramic particles at the boundary region B, the ceramic particles can be easily and completely removed during sintering or the like, and the contour of the structure body S of the three-dimensional shaped article can be formed with high precision.

Figure 2:
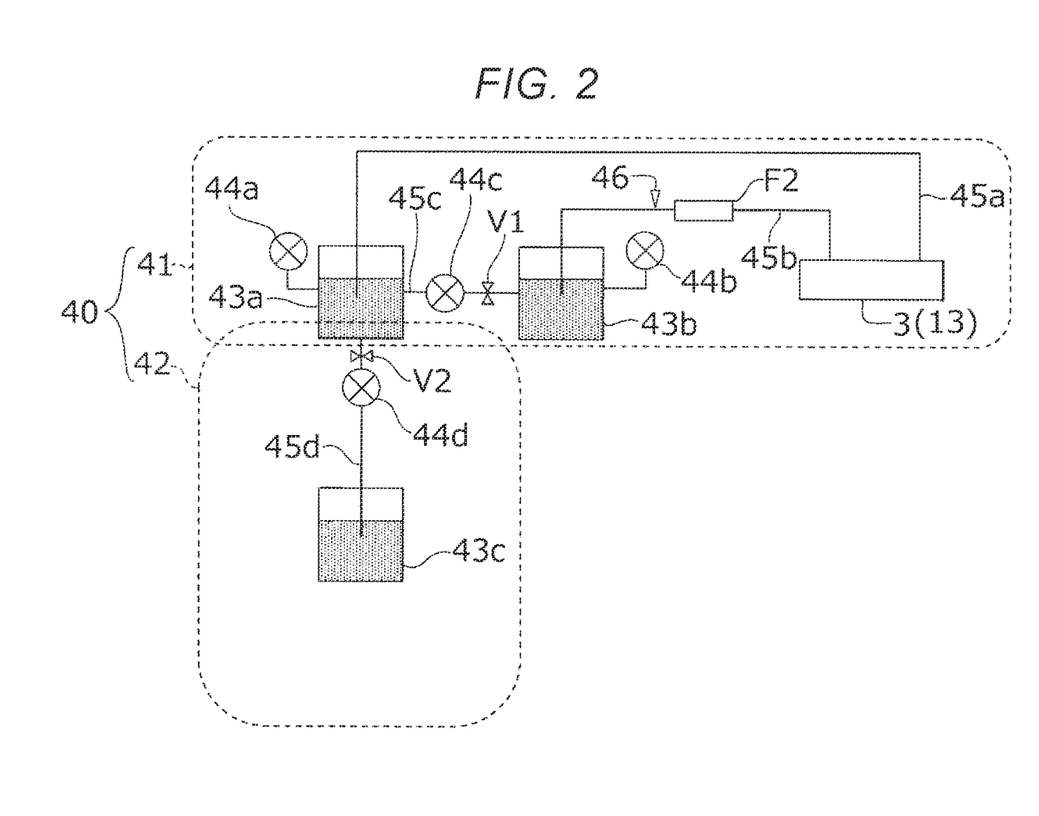
FIG. 2 is a schematic view showing a liquid sharing system of the three-dimensional shaping apparatus in FIG. 1.
Figure 3:
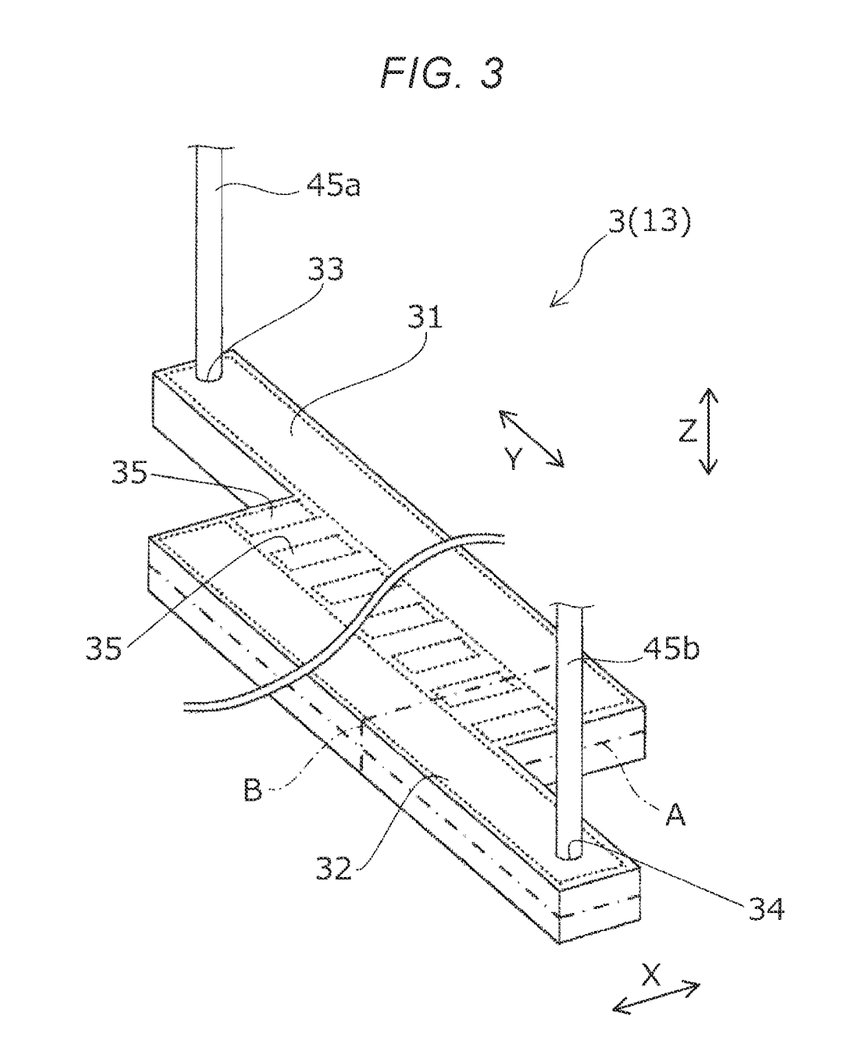
FIG. 3 is a perspective view showing a head of the three-dimensional shaping apparatus in FIG. 1.
Figure 4:
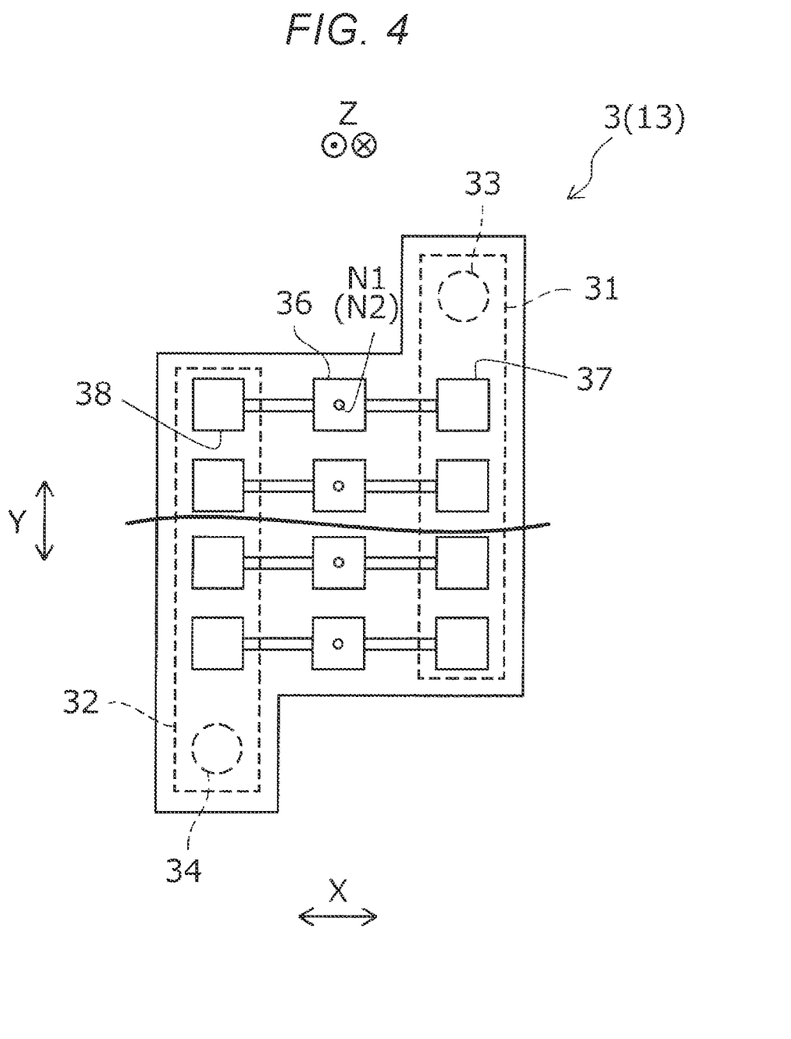
FIG. 4 is a cross-sectional view taken along the alternate long and short dash line A in FIG. 3 when viewed from the bottom face side showing the head of the three-dimensional shaping apparatus in FIG. 1, and is a view showing some constituent members in a see-through manner with a broken line.

Hereinafter, the liquid supply system 40, the first head 3, and the second head 13 will be described in detail with reference to FIGS. 2 to 5. Here, the liquid supply system 40 shown in FIG. 2 is constituted by a circulation section 41 including a supply flow channel 45a for supplying a liquid to the first head 3 and the second head 13, and a replenishment section 42 including a liquid replenishment flow channel 45d for replenishing a liquid to the circulation section 41. Note that the reference numeral 3 in FIG. 2 and FIGS. 3 and 4 show the first head 3, however, the first head 3 and the second head 13 are the same in terms of the configuration and the liquid supply system coupled thereto. Therefore, the following description with respect to the first head 3 can be understood by substituting the first head 3 with the second head 13.

First, the liquid supply system 40 will be described. As shown in FIG. 2, the circulation section 41 includes the first head 3 (second head 13), a pressurization controlling liquid tank 43a, a depressurization controlling liquid tank 43b, a pressurization controlling pump 44a, a depressurization controlling pump 44b, a flowing pump 44c, and a solenoid valve V1. Further, the circulation section 41 includes the supply flow channel 45a that couples the pressurization controlling liquid tank 43a to the first head 3 (second head 13), a first circulation flow channel 45b that couples the first head 3 (second head 13) to the depressurization controlling liquid tank 43b, and a second circulation flow channel 45c that couples the pressurization controlling liquid tank 43a to the depressurization controlling liquid tank 43b. Here, in the first circulation flow channel 45b, a filter F2, and a flow rate sensor 46 that detects the flow rate of the liquid flowing in the first circulation flow channel 45b are provided.

By the pressurization controlling liquid tank 43a, the pressurization controlling pump 44a, the depressurization controlling liquid tank 43b, and the depressurization controlling pump 44b, differential pressure control is performed so that a negative pressure is slightly applied to the nozzle N1 of the first head 3 (the second nozzle N2 of the second head 13) from the atmospheric pressure.

In the second circulation flow channel 45c that allows a liquid to flow from the depressurization controlling liquid tank 43b which is a tank for depressurization to the pressurization controlling liquid tank 43a which is a tank for pressurization, the flowing pump 44c and the solenoid valve V1 are placed. In a case where a liquid ejection operation in the first head 3 (second head 13) is executed, when a liquid is supplied to the first head 3 (second head 13), the solenoid valve V1 is opened to cause the flowing pump 44c to operate, and the liquid is circulated in the supply flow channel 45a, the first circulation flow channel 45b, and the second circulation flow channel 45c.

The replenishment section 42 includes a liquid cartridge 43c, which is replaceable, and in which a liquid is stored, a flowing pump 44d, and a solenoid valve V2. Further, the replenishment section 42 includes the liquid replenishment flow channel 45d that couples the pressurization controlling liquid tank 43a to the liquid cartridge 43c. When a liquid is replenished from the liquid cartridge 43c to the pressurization controlling liquid tank 43a, the solenoid valve V2 is opened to cause the flowing pump 44d to operate, and the liquid is allowed to flow in the liquid replenishment flow channel 45d. Here, the three-dimensional shaping apparatus 1 of this embodiment is configured such that the liquid supply system 40 having the same configuration is provided one by one for each of the first head 3 and the second head 13.

Next, a detailed configuration of the first head 3 (second head 13) will be described with reference to FIGS. 3 to 5. Note that the solid line arrows in FIG. 5 indicate directions at which a liquid flows inside the first head 3 (second head 13).

As shown in FIG. 3, the first head 3 (second head 13) is coupled to the supply flow channel 45a and the first circulation flow channel 45b. The supply flow channel 45a as the supply flow channel for supplying a liquid to the inside of the first head 3 (second head 13), and the first circulation flow channel 45b as the circulation flow channel for circulating the liquid inside the first head 3 (second head 13) by once discharging the liquid outside can be regarded as constituting a part of the first head 3 (second head 13). Expressed in another way, the first head 3 (second head 13) includes the supply flow channel 45a and the first circulation flow channel 45b. The supply flow channel 45a is coupled to a supply port 33, and the first circulation flow channel 45b is coupled to a discharge port 34.

Figure 5:
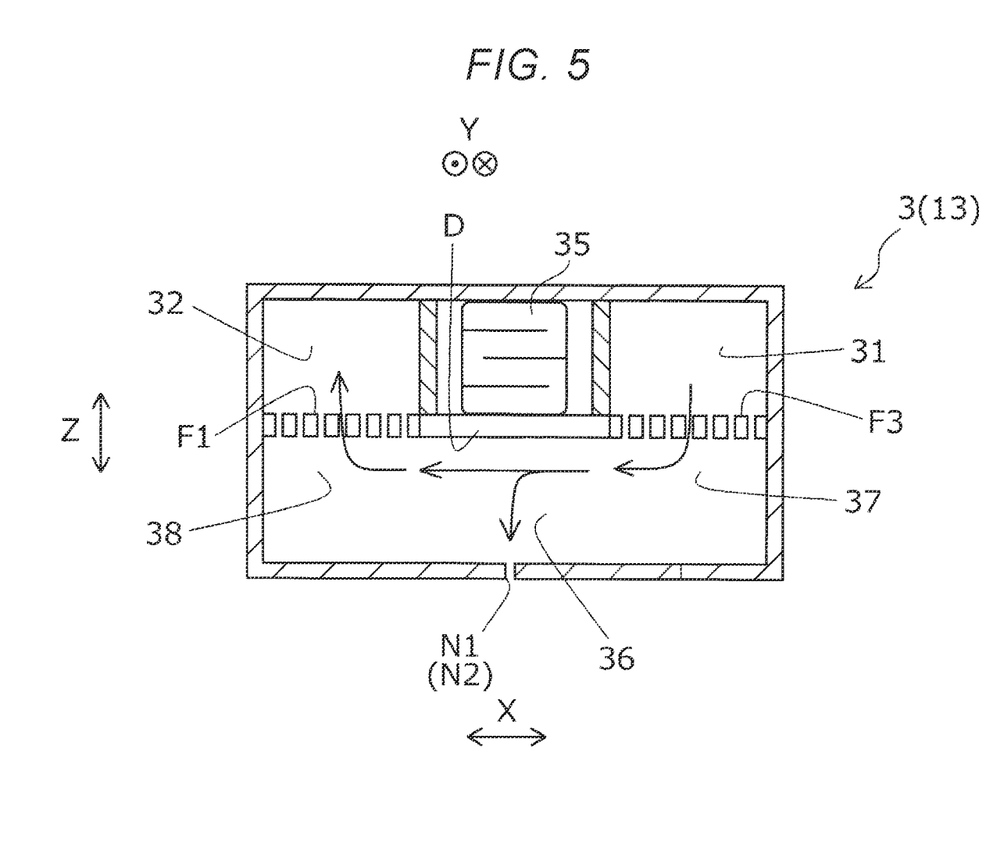
FIG. 5 is a cross-sectional side view taken along the alternate long and short dash line B in FIG. 3 showing the head of the three-dimensional shaping apparatus in FIG. 1.

As shown in FIGS. 3 to 5, the first head 3 (second head 13) includes a supply liquid chamber 31 having the supply port 33, and a liquid is sent to the supply liquid chamber 31 from the supply flow channel 45a through the supply port 33. Further, as shown in FIGS. 4 and 5, the first head 3 (second head 13) includes an individual supply flow channel 37 that communicates with the supply liquid chamber 31 through a filter F3, and the liquid supplied to the supply liquid chamber 31 is sent to the individual supply flow channel 37.

As shown in FIGS. 3 and 5, the first head 3 (second head 13) includes a piezoelectric element 35 that is deformed along the Z direction by applying a voltage, and the piezoelectric element 35 is disposed in a space at an opposite side to a pressure chamber 36 across a vibration plate D in the Z direction. As shown in FIGS. 4 and 5, the pressure chamber 36 communicates with the individual supply flow channel 37, and a liquid is sent to the pressure chamber 36 from the individual supply flow channel 37. Further, the first nozzle N1 (second nozzle N2) communicates with the pressure chamber 36, and the volume of the pressure chamber 36 is shrunk by deforming the piezoelectric element 35 so as to pressurize the liquid in the pressure chamber 36, whereby the liquid is ejected from the first nozzle N1 (second nozzle N2). Note that the lower side in FIG. 5 is a vertically downward direction, and the ejection direction of the liquid from the first nozzle N1 (second nozzle N2) is the vertically downward direction corresponding to the gravity direction.

As described above, the three-dimensional shaping apparatus 1 of this embodiment includes the liquid supply system 40 shown in FIG. 2, and circulates a liquid to be supplied to the first head 3 (second head 13) and supplies the liquid. Therefore, in order to circulate the liquid once sent to the pressure chamber 36, the pressure chamber 36 also communicates with an individual circulation flow channel 38 in addition to the individual supply flow channel 37. The individual circulation flow channel 38 communicates with a circulation liquid chamber 32 having the discharge port 34 through a filter F1. The three-dimensional shaping apparatus 1 of this embodiment circulates a liquid by allowing the liquid to flow in the supply flow channel 45a, the supply liquid chamber 31, the individual supply flow channel 37, the pressure chamber 36, the individual circulation flow channel 38, the circulation liquid chamber 32, and the first circulation flow channel 45b inside the first head 3 (second head 13).

As described above, the first head 3 and the second head 13 include the pressure chamber 36 that communicates with the first nozzle N1 and the second nozzle N2, the supply flow channel 45a as the supply channel for supplying the liquid containing the binder and the liquid containing the ceramic particles to the pressure chamber 36, the supply liquid chamber 31, the individual supply flow channel 37, the individual circulation flow channel 38 as the circulation channel in which the liquid containing the binder and the liquid containing the ceramic particles flow from the pressure chamber 36 for circulation, the circulation liquid chamber 32, and the first circulation flow channel 45b. Here, the ceramic particles are heavy and are likely to precipitate, however, in the three-dimensional shaping apparatus 1 of this embodiment, as described above, the second head 13 includes the circulation channel for circulating the liquid containing the ceramic particles. Therefore, precipitation of the ceramic particles can be suppressed by circulating the liquid containing the ceramic particles, and a trouble caused by precipitation of the ceramic particles in the liquid containing the ceramic particles can be suppressed.

The control unit 12 performs control so that when the flow rate of the liquid containing the ceramic particles that flows in the circulation channel per unit time is represented by q1 and the maximum flow rate of the liquid containing the ceramic particles ejected from the second nozzle N2 per unit time is represented by q2, q2/q1 becomes 0.05 or more and 20 or less. That is, the three-dimensional shaping apparatus 1 of this embodiment controls the flow rate of the liquid containing the ceramic particles flowing in the circulation channel to be within an appropriate range. According to this, the increase in the pressure difference between the pressure applied to the liquid in the second nozzle N2 and the outside air pressure can be suppressed. In the three-dimensional shaping apparatus 1 of this embodiment, mixing of the powder for forming the layer 500 in the second nozzle N2 can be suppressed by suppressing the increase in the pressure difference.

In a normal state, the control unit 12 controls the q2/q1 to be 0.05. That is, the three-dimensional shaping apparatus 1 of this embodiment controls the flow rate of the liquid containing the ceramic particles flowing in the circulation channel to be within a particularly preferred range. According to this, in the three-dimensional shaping apparatus 1 of this embodiment, the increase in the pressure difference between the pressure applied to the liquid in the second nozzle N2 and the outside air pressure can be particularly effectively suppressed, and mixing of the powder for forming the layer 500 in the second nozzle N2 can be particularly effectively suppressed.

Next, specific examples of the shaping material which can be used in the three-dimensional shaping apparatus 1 of this embodiment will be described. As a metal powder that can be contained in the shaping material, for example, a simple substance powder of magnesium (Mg), iron (Fe), cobalt (Co), chromium (Cr), aluminum (Al), titanium (Ti), copper, (Cu), or nickel (Ni), or a powder of an alloy containing one or more of these metals (a maraging steel, stainless steel (SUS), cobalt-chrome-molybdenum, a titanium alloy, a nickel alloy, an aluminum alloy, a cobalt alloy, or a cobalt-chromium alloy), or a mixed powder of these powders can be used.

Further, as the binder contained in the liquid to be ejected to the shaping region P from the first head 3, for example, PMMA (acrylic), ABS (acrylonitrile-butadiene-acrylate), ASA (acrylonitrile-styrene-acrylate), PLA (polylactic acid), PEI (polyetherimide), PC (polycarbonate), PP (polypropylene), PE (polyethylene), PA (polyamide), EP (epoxy), PPS (polyphenylene sulfide), PS (polystyrene), paraffin wax, PVA (polyvinyl alcohol), carboxymethyl cellulose, polyoxymethylene, polymethyl methacrylate, or the like can be preferably used. In addition, for example, an acrylic resin, an epoxy resin, a silicone resin, a cellulosic resin, another synthetic resin, or the like can be used alone or in combination. Further, a thermoplastic resin, or a UV curable resin of a type using unsaturated double bond radical polymerization such as an acrylic resin, or a type using cationic polymerization such as an epoxy resin can also be used.

Further, as the ceramic particles contained in the liquid to be ejected to the boundary region B from the second head 13, for example, silicon dioxide ($SiO_2$), titanium dioxide ($TiO_2$), aluminum oxide ($Al_2O_3$), zirconium oxide ($ZrO_2$), silicon nitride ($Si_3N_4$), or the like can be preferably used. Among these, $TiO_2$ can be particularly preferably used, and above all, anatase-type $TiO_2$ can be particularly preferably used. This is because the particle diameter of the anatase-type $TiO_2$ particle is smaller than that of other general ceramic particles, and therefore, the surface activity of the ceramic particles becomes high, so that the ceramic particles are easily dispersed in the liquid stored in the second head. Further, the anatase-type $TiO_2$ particle is more easily decomposed than a rutile-type $TiO_2$ particle, and therefore, the boundary region B can be easily removed from the structure body S of the shaped three-dimensional shaped article.

Further, as the solvent contained in the liquid to be ejected from the first head 3 and the second head 13, for example, water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; ionic liquids such as tetra-alkyl ammonium acetate (for example, tetra-butyl ammonium acetate, etc.), and the like are exemplified, and one type or two or more types in combination selected from these can be used.

Figure 6:
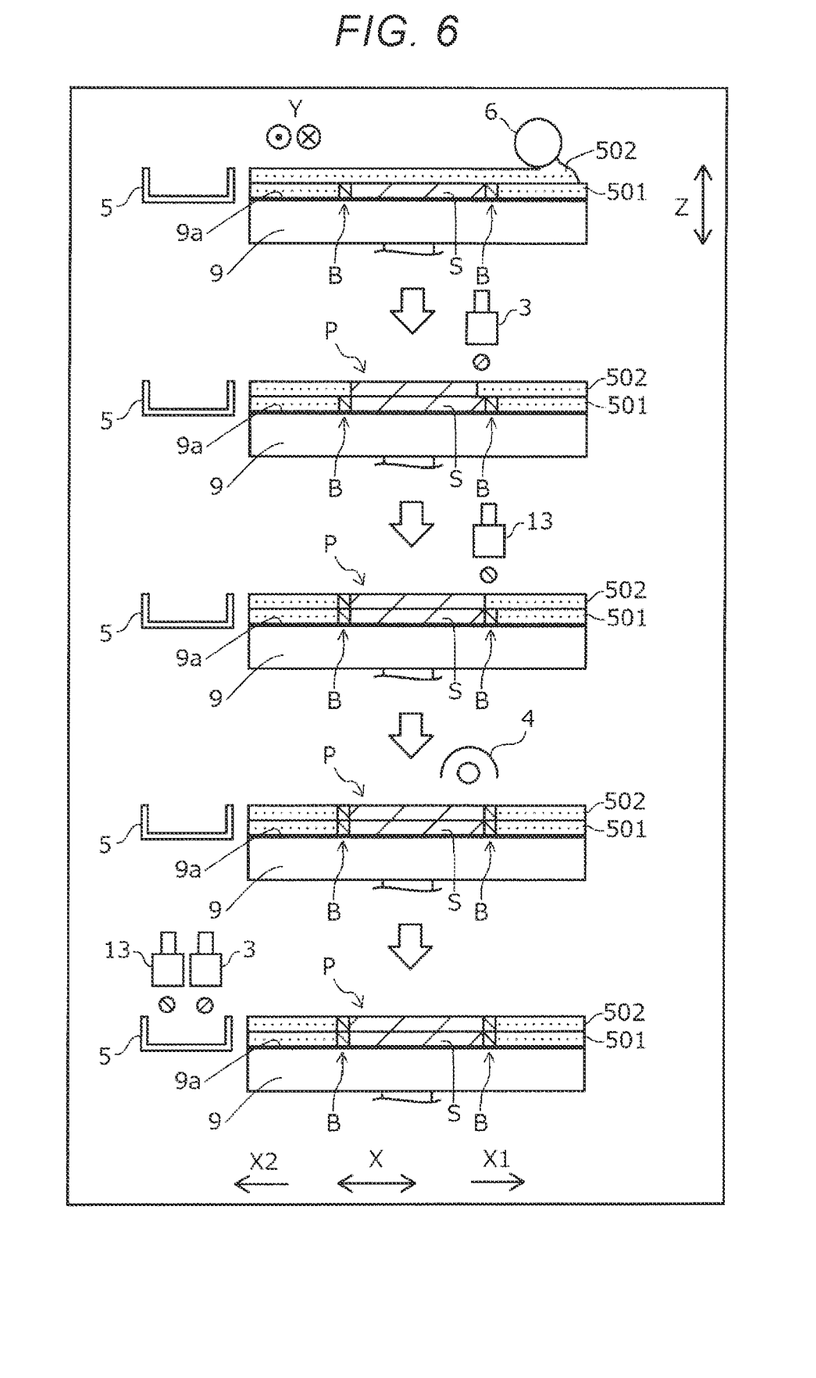
FIG. 6 is a schematic view for illustrating a three-dimensional shaping method performed using the three-dimensional shaping apparatus in FIG. 1.
Figure 7:
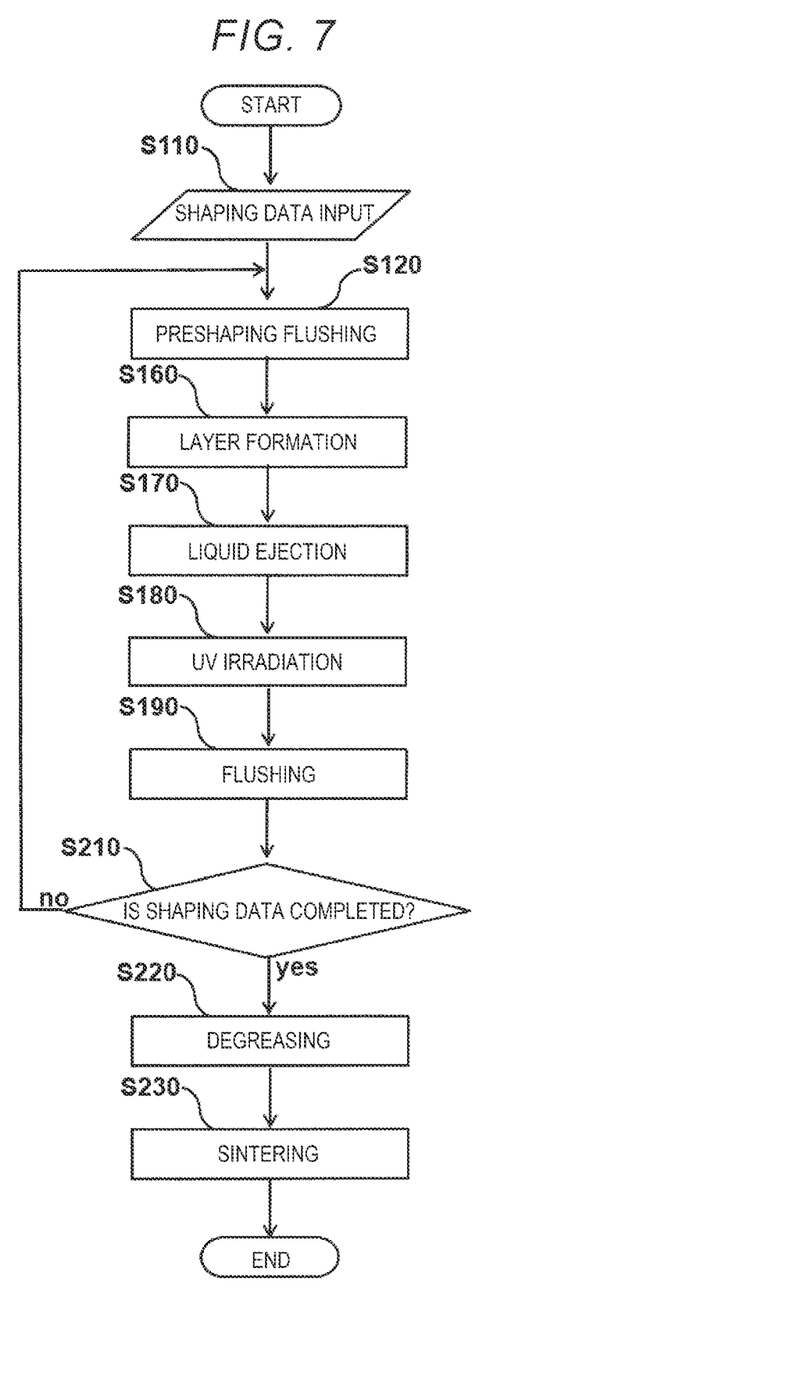
FIG. 7 is a flowchart of the three-dimensional shaping method performed using the three-dimensional shaping apparatus in FIG. 1.
Figure 8:
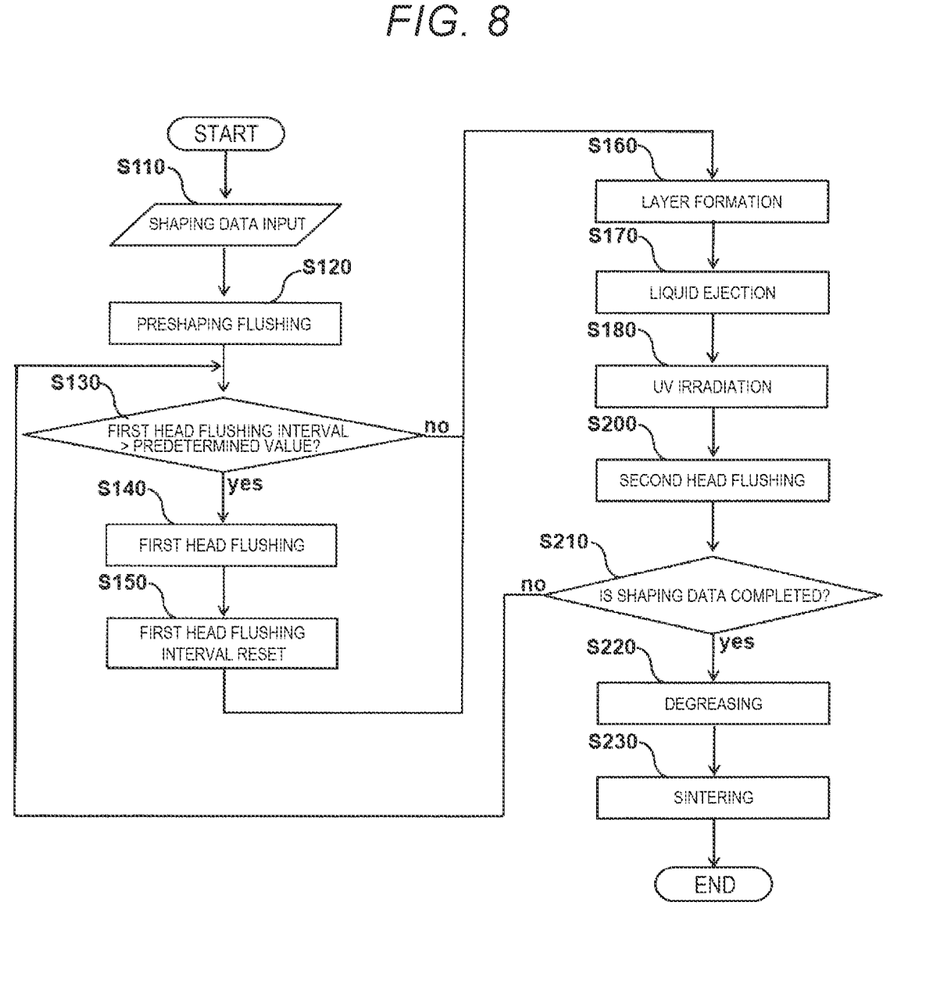
FIG. 8 is a flowchart of a three-dimensional shaping method performed using the three-dimensional shaping apparatus in FIG. 1, and is a flowchart of a three-dimensional shaping method different from the three-dimensional shaping method in FIG. 7.

Next, an example of a three-dimensional shaping method that can be executed using the three-dimensional shaping apparatus 1 of this embodiment will be described using the flowcharts of FIGS. 7 and 8 while referring to FIG. 6. The three-dimensional shaping method of this embodiment shown in the flowcharts of FIGS. 7 and 8 is carried out by allowing the control unit 12 to control the respective constituent members of the three-dimensional shaping apparatus 1 such as the supply unit 8 and the shaping table 9. FIG. 6 shows an example when the layer 502 in the layer 500 is formed.

First, the three-dimensional shaping method shown in the flowchart of FIG. 7 will be described. As shown in FIG. 7, first, in a shaping data input step of Step S110, the shaping data of a three-dimensional shaped article to be produced is input. The input source of the shaping data of the three-dimensional shaped article is not particularly limited, however, the shaping data can be input to the three-dimensional shaping apparatus 1 using the external device 20.

Subsequently, in a preshaping flushing step of Step S120, preshaping flushing is performed for the first head 3 and the second head 13. Here, the preshaping flushing is performed at a position opposed to the liquid receiving section 5 that is the flushing position after moving the first head 3 and the second head 13 to the position. In this step S120, the preshaping flushing is performed simultaneously for the first head 3 and the second head 13, however, the preshaping flushing may be performed sequentially for the first head 3 and the second head 13. The preshaping flushing step of this Step S120 may be omitted.

Subsequently, in a layer formation step of Step S160, the layer 500 is formed by supplying the shaping material from the shaping material supply section 2 to the shaping face 9a of the shaping table 9, and also compressing and leveling the shaping material with the roller 6. The uppermost state in FIG. 6 shows a state where the layer 502 is formed by moving the supply unit 8 in the X1 direction.

Subsequently, in a liquid ejection step of Step S170, the liquid containing the binder is ejected from the nozzle N1 of the first head 3 to the shaping region P of the three-dimensional shaped article in the layer 500. The second state from the top in FIG. 6 shows a state where the liquid containing the binder is ejected from the nozzle N1 of the first head 3 to the shaping region P of the layer 502 while moving the supply unit 8 in the X1 direction. Then, in the liquid ejection step of this Step S170, subsequently, the liquid containing the ceramic particles is ejected from the nozzle N2 of the second head 13 to the boundary region B with respect to the shaping region P in the layer 500. The third state from the top in FIG. 6 shows a state where the liquid containing the ceramic particles is ejected from the nozzle N2 of the second head 13 to the boundary region B of the layer 502 while moving the supply unit 8 in the X1 direction.

Subsequently, in a UV irradiation step of Step S180, an ultraviolet ray is irradiated from the UV irradiation section 4 to the shaping region P of the three-dimensional shaped article in the layer 500. The fourth state from the top in FIG. 6 shows a state where an ultraviolet ray is irradiated from the UV irradiation section 4 to the shaping region P of the three-dimensional shaped article in the layer 502 while moving the supply unit 8 in the X1 direction.

Subsequently, in a flushing step of Step S190, flushing of the first head 3 and the second head 13 is performed. Here, the flushing in this step is performed at a position opposed to the liquid receiving section 5 that is the flushing position after moving the first head 3 and the second head 13 to the position in the same manner as the preshaping flushing step. Further, also in this step S190, the preshaping flushing is performed simultaneously for the first head 3 and the second head 13 in the same manner as in the preshaping flushing step. The lowermost state in FIG. 6 shows a state where the first head 3 and the second head 13 are moved to the position opposed to the liquid receiving section 5, and flushing in which the liquid is ejected to the liquid receiving section 5 from the first head 3 and the second head 13 is performed.

Here, the control unit 12 causes the first head 3 to execute a first flushing operation and causes the second head 13 to execute a second flushing operation under a flushing condition different from that for the first flushing operation in the flushing step of this step. The flushing condition different between the first flushing operation and the second flushing operation will be described later.

Then, in a shaping data completion determination step of Step S210, it is determined whether or not the formation of the layer 500 based on the shaping data input in Step S110 is all completed in the control unit 12 of the three-dimensional shaping apparatus 1. When it is determined that the formation of the layer 500 is not all completed, the process is returned to the preshaping flushing step of Step S120, and the subsequent layer 500 is formed. On the other hand, when it is determined that the formation of the layer 500 is all completed, the process proceeds to a degreasing step of Step S220.

In the degreasing step of Step S220, a resin component of the structure body S produced by repeating the process from the preshaping flushing step of Step S120 to the shaping data completion determination step of Step S210 such as the binder is degreased using an external device or the like. As a degreasing method, a method of volatilizing the resin component by heating, a method of dissolving the resin component by immersing the structure body S in a solvent, or the like is exemplified, but the method is not particularly limited. The degreasing step of this Step S220 may be omitted depending on the type or the like of the three-dimensional shaped article to be produced, for example, when a three-dimensional shaped article made of a resin is produced.

Then, in a sintering step of Step S230, the shaping material is sintered by heating the structure body S after being degreased in the degreasing step of Step S220 using an external device or the like. Even if the resin component such as the binder of the structure body S remains even after executing the degreasing step of Step S220, the resin component is removed with the execution of the sintering step of this Step S230. Then, with the completion of the sintering step of this Step S230, the three-dimensional shaping method of this embodiment is completed. The sintering step of this Step S230 may be omitted depending on the type of the three-dimensional shaped article to be produced in the same manner as the degreasing step of Step S220.

Next, the three-dimensional shaping method shown in the flowchart of FIG. 8 will be described. In the three-dimensional shaping method shown in the flowchart of FIG. 8, Step S110 to Step S120, Step S160 to Step S180, and Step S210 to Step S230 are common to those of the three-dimensional shaping method shown in the flowchart of FIG. 7. Therefore, the description of these steps will be omitted.

As shown in FIG. 8, after completion of Step S120, in a first head flushing interval determination step of Step S130, it is determined whether a flushing interval for the first head 3 is longer than a predetermined value by the control unit 12. When the control unit 12 determined that the flushing interval is longer than the predetermined value in this step, the process shifts to a first head flushing step of Step S140 to execute flushing of the first head 3, and in a first head flushing interval reset step of Step S150, the final flushing time for the first head 3 is reset, and the process shifts to a layer formation step of Step S160. On the other hand, when the control unit 12 determined that the flushing interval is no longer than the predetermined value in this step, the process shifts to the layer formation step of Step S160 without executing flushing of the first head 3. In the first head flushing step of Step S140, the first head 3 is moved to a position opposed to the liquid receiving section 5 that is the flushing position, and flushing of the first head 3 is performed at the position.

Further, as shown in FIG. 8, after the UV irradiation step of Step S180, the process shifts to a second head flushing step of Step S200, and flushing of the second head 13 is executed. In the second head flushing step of Step S200, the second head 13 is moved to a position opposed to the liquid receiving section 5 that is the flushing position, and flushing of the second head 13 is performed at the position in the same manner as in the first head flushing step of Step S140.

Here, in the three-dimensional shaping method shown in the flowchart of FIG. 8, by executing the first head flushing interval determination step of Step S130, the execution frequency of the first head flushing step of Step S140 and the second head flushing step of Step S200 can be changed. For example, while executing the second head flushing step for every scanning operation (movement in the X direction) of the supply unit 8, the first head flushing step can be executed for every four scanning operations of the supply unit 8. Further, the control unit 12 makes the flushing condition different between the first flushing operation in the first head flushing step of Step S140 and the second flushing operation in the second head flushing step of this step. The flushing condition different between the first flushing operation and the second flushing operation will be described later.

The above description is once summarized as follows. In the three-dimensional shaping apparatus 1 of this embodiment, the control unit 12 performs control so as to cause the first head 3 to execute the first flushing operation, and to cause the second head 13 to execute the second flushing operation under a flushing condition different from that for the first flushing operation. A preferred flushing condition is different between the first head 3 that ejects the liquid containing the binder and the second head 13 that ejects the liquid containing the ceramic particles, however, in the three-dimensional shaping apparatus 1 of this embodiment, by executing the second flushing operation for the second head 13 under a flushing condition different from that for the first flushing operation executed for the first head 3, flushing can be carried out under a preferred flushing condition for each of the first head 3 and the second head 13. Therefore, in the three-dimensional shaping apparatus 1 of this embodiment, it is possible to suppress that the powder mixed in the nozzle cannot be removed even if the flushing operation is performed.

Here, the flushing condition different between the first flushing operation and the second flushing operation will be described. In the three-dimensional shaping apparatus 1 of this embodiment, the second flushing operation is performed under a condition capable of more effectively discharging an ink in the head than that for the first flushing operation. This is because, in general, it is often more difficult to discharge a powder mixed in a nozzle when there is a liquid containing ceramic particles in the nozzle than when there is a liquid containing a binder in the nozzle.

In the three-dimensional shaping apparatus 1 of this embodiment, the frequency of the waveform input to the second head 13 in the second flushing operation can be set higher than the frequency of the waveform input to the first head 3 in the first flushing operation. When the frequency of the waveform input to the head is set high, it becomes possible to effectively discharge a powder mixed in the nozzle, and therefore, in the three-dimensional shaping apparatus 1 of this embodiment, not only when a powder is mixed in the first head 3, but also when a powder is mixed in the second head 13, the powder mixed in the nozzle can be effectively discharged.

Further, in the three-dimensional shaping apparatus 1 of this embodiment, the voltage applied to the second head 13 in the second flushing operation can be set higher than the voltage applied to the first head 3 in the first flushing operation. When the voltage applied to the head is set high, it becomes possible to effectively discharge a powder mixed in the nozzle, and therefore, in the three-dimensional shaping apparatus 1 of this embodiment, not only when a powder is mixed in the first head 3, but also when a powder is mixed in the second head 13, the powder mixed in the nozzle can be effectively discharged.

Further, in the three-dimensional shaping apparatus 1 of this embodiment, by adjusting the voltage applied to a head or the waveform when the voltage is applied to a head, the ejection rate of the liquid containing the ceramic particles from the second head 13 in the second flushing operation can be set higher than the ejection rate of the liquid containing the binder from the first head 3 in the first flushing operation. When the ejection rate of the liquid from the head is set high, it becomes possible to effectively discharge a powder mixed in the nozzle, and therefore, in the three-dimensional shaping apparatus 1 of this embodiment, not only when a powder is mixed in the first head 3, but also when a powder is mixed in the second head 13, the powder mixed in the nozzle can be effectively discharged.

Further, in the three-dimensional shaping apparatus 1 of this embodiment, by adjusting the voltage applied to a head or the waveform when the voltage is applied to a head, the droplet size of the liquid containing the ceramic particles ejected from the second head 13 in the second flushing operation can be set larger than the droplet size of the liquid containing the binder ejected from the first head 3 in the first flushing operation. When the ejection amount of the liquid from the head is set large, it becomes possible to effectively discharge a powder mixed in the nozzle, and therefore, in the three-dimensional shaping apparatus 1 of this embodiment, not only when a powder is mixed in the first head 3, but also when a powder is mixed in the second head 13, the powder mixed in the nozzle can be effectively discharged.

Further, in the three-dimensional shaping apparatus 1 of this embodiment, by adjusting the voltage applied to a head or the waveform when the voltage is applied to a head, the number of droplets of the liquid containing the ceramic particles ejected from the second head 13 in the second flushing operation can be set larger than the number of droplets of the liquid containing the binder ejected from the first head 3 in the first flushing operation. When the ejection amount of the liquid from the head is set large, it becomes possible to effectively discharge a powder mixed in the nozzle, and therefore, in the three-dimensional shaping apparatus 1 of this embodiment, not only when a powder is mixed in the first head 3, but also when a powder is mixed in the second head 13, the powder mixed in the nozzle can be effectively discharged.

Further, it is described that in the three-dimensional shaping apparatus 1 of this embodiment, the first head 3 that ejects the liquid containing the binder to the shaping region P of the three-dimensional shaped article in the layer 500 from the first nozzle N1 and the second head 13 that ejects the liquid containing the ceramic particles to the boundary region B with respect to the shaping region P in the layer 500 from the second nozzle N2 are included, however, the liquid to be ejected from the first nozzle N1 may contain near-infrared absorbing particles or visible light absorbing particles, and the liquid to be ejected from the second nozzle N2 may contain a colloidal ink or a polymeric ink. In the case of such a configuration, in an energy application step of Step S180, by applying energy such as an ultraviolet ray, an infrared ray, or a near-infrared ray, a portion of the shaping material to which the near-infrared absorbing particles or the visible light absorbing particles were supplied can be fused by being heated to above the melting point of the shaping material. The control unit 12 causes the first head 3 to execute the first flushing operation and causes the second head 13 to execute the second flushing operation under a flushing condition different from that for the first flushing operation in the flushing step of this step. In the three-dimensional shaping apparatus 1 of this embodiment, the frequency of the waveform input to the second head 13 in the second flushing operation can be set higher than the frequency of the waveform input to the first head 3 in the first flushing operation. When the frequency of the waveform input to the head is set high, it becomes possible to effectively discharge a powder mixed in the nozzle, and therefore, in the three-dimensional shaping apparatus 1 of this embodiment, not only when a powder is mixed in the first head 3, but also when a powder is mixed in the second head 13, the powder mixed in the nozzle can be effectively discharged.

The above-mentioned different flushing condition is a condition in which the voltage applied to the first head 3 in the first flushing operation is set higher than the voltage applied to the second head 13 in the second flushing operation, a condition in which the ejection rate of the liquid containing near-infrared absorbing particles or visible light absorbing particles from the first head 3 in the first flushing operation is set higher than the ejection rate of the liquid containing a colloidal ink or a polymeric ink from the second head 13 in the second flushing operation by adjusting the voltage applied to a head or the waveform when the voltage is applied to a head, a condition in which the droplet size of the liquid containing near-infrared absorbing particles or visible light absorbing particles ejected from the first head 3 in the first flushing operation is set larger than the droplet size of the liquid containing a colloidal ink or a polymeric ink ejected from the second head 13 in the second flushing operation by adjusting the voltage applied to a head or the waveform when the voltage is applied to a head, or the like.

The present disclosure is not limited to the above-mentioned embodiments, but can be realized in various configurations without departing from the gist of the present disclosure. For example, the technical features in the embodiments corresponding to the technical features in the respective aspects described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A three-dimensional shaping apparatus, comprising:
   a shaping table;
   a layer forming section that is configured to form a powder layer at the shaping table;
   a first head that is configured to eject a first liquid containing a binder to a shaping region of a three-dimensional shaped article in the powder layer from a first nozzle;
   a second head that is configured to eject a second liquid containing ceramic particles to a boundary region with respect to the shaping region in the powder layer from a second nozzle, the second head comprising a supply liquid chamber, a circulation liquid chamber, and a circulation flow channel in which the second liquid flows from the supply liquid chamber to the circulation liquid chamber, with any of the second liquid flowing the circulation liquid chamber that is not ejected from a second nozzle in fluid communication with the circulation liquid chamber being returned to the supply liquid chamber through the circulation flow channel; and a control unit that is configured to control movement of the first head and the second head with respect to the shaping table and driving of the first head and the second head by applying a voltage, wherein the control unit is configured to control the first head to execute a first flushing operation and to control the second head to execute a second flushing operation under a flushing condition different from that for the first flushing operation, and the control unit is configured to control a flow rate of the second liquid that flows in the circulation channel and a flow rate of the second liquid ejected from the second nozzle, the flow rate of the second liquid that flows in the circulation channel being detected by a flow rate sensor within a circulation section, wherein, when the flow rate of the second liquid that flows in the circulation channel per unit time is represented by q1 and a maximum flow rate of the second liquid ejected from the second nozzle per unit time is represented by q2, the control unit is configured to control the first head unit and the second head unit so q2/q1 is between 0.05 and 20 during ejection of the second liquid containing ceramic particles to a boundary region with respect to the shaping region in the powder layer.

2. The three-dimensional shaping apparatus according to claim 1, wherein a frequency of a waveform input to the second head in the second flushing operation is higher than a frequency of a waveform input to the first head in the first flushing operation.

3. The three-dimensional shaping apparatus according to claim 1, wherein the voltage applied to the second head in the second flushing operation is higher than the voltage applied to the first head in the first flushing operation.

4. The three-dimensional shaping apparatus according to claim 1, wherein an ejection rate of the liquid containing the ceramic particles from the second head in the second flushing operation is higher than an ejection rate of the liquid containing the binder from the first head in the first flushing operation.

5. The three-dimensional shaping apparatus according to claim 1, wherein a droplet size of the liquid containing the ceramic particles ejected from the second head in the second flushing operation is larger than a droplet size of the liquid containing the binder ejected from the first head in the first flushing operation.

6. The three-dimensional shaping apparatus according to claim 1, wherein the second head includes a pressure chamber that communicates with the second nozzle, a supply channel for supplying the liquid containing the ceramic particles to the pressure chamber, and the circulation channel in which the liquid containing the ceramic particles flows from the pressure chamber for circulation.

7. The three-dimensional shaping apparatus according to claim 1, wherein the q2/q1 is 0.05.

8. The three-dimensional shaping apparatus according to claim 1, wherein the ceramic particles contain anatase-type $TiO_2$.

9. A three-dimensional shaping apparatus, comprising:
a shaping table;
a layer forming section that forms a powder layer at the shaping table;
a first head that ejects a first liquid containing light absorbing particles to a shaping region of a three-dimensional shaped article in the powder layer from a first nozzle;
a second head that ejects a second liquid containing a colloidal ink or a polymeric ink to a boundary region with respect to the shaping region in the powder layer from a second nozzle, the second head comprising a supply liquid chamber, a circulation liquid chamber, and a circulation flow channel in which the second liquid flows from the supply liquid chamber to the circulation liquid chamber, with any of the second liquid flowing to the circulation liquid chamber that is not ejected from a second nozzle in fluid communication with the circulation liquid chamber being returned to the supply liquid chamber through the circulation flow channel; and
a control unit configured to control movement of the first head and the second head with respect to the shaping table and driving of the first head and the second head by applying a voltage, wherein
the control unit is configured to control the first head to execute a first flushing operation and to control the second head to execute a second flushing operation under a flushing condition different from that for the first flushing operation, and
the control unit is configured to control a flow rate of the second liquid that flows in the circulation channel and a flow rate of the second liquid containing ejected from the second nozzle, the flow rate of the second liquid that flows in the circulation channel being detected by a flow rate sensor within a circulation section,
wherein, where a flow rate of the second liquid that flows in the circulation channel per unit time is represented by q1 and a maximum flow rate of the second liquid ejected from the second nozzle per unit time is represented by q2, the control unit is configured to control the first head unit and the second head unit so q2/q1 is between 0.05 and 20 during ejection of the second liquid containing ceramic particles to a boundary region with respect to the shaping region in the powder layer.

10. The three-dimensional shaping apparatus according to claim 1, further comprising an ultraviolet irradiation section or a heater, wherein irradiating the first liquid or the second liquid by the ultraviolet irradiation section or heating the first liquid or the second liquid by the heater is performed between the first flushing operation and the second flushing operation.

11. The three-dimensional shaping apparatus according to claim 1, wherein the first flushing operation is performed when a flushing interval is longer than a predetermined value as determined by the control unit.

12. The three-dimensional shaping apparatus according to claim 1, wherein the first flushing operation is performed following input of shaping data to form and before commencement of ejection of the first liquid and the second liquid.

13. The three-dimensional shaping apparatus according to claim 1, wherein the flow rate sensor is within the circulation section containing the circulation flow channel.

* * * * *